Figure 1:
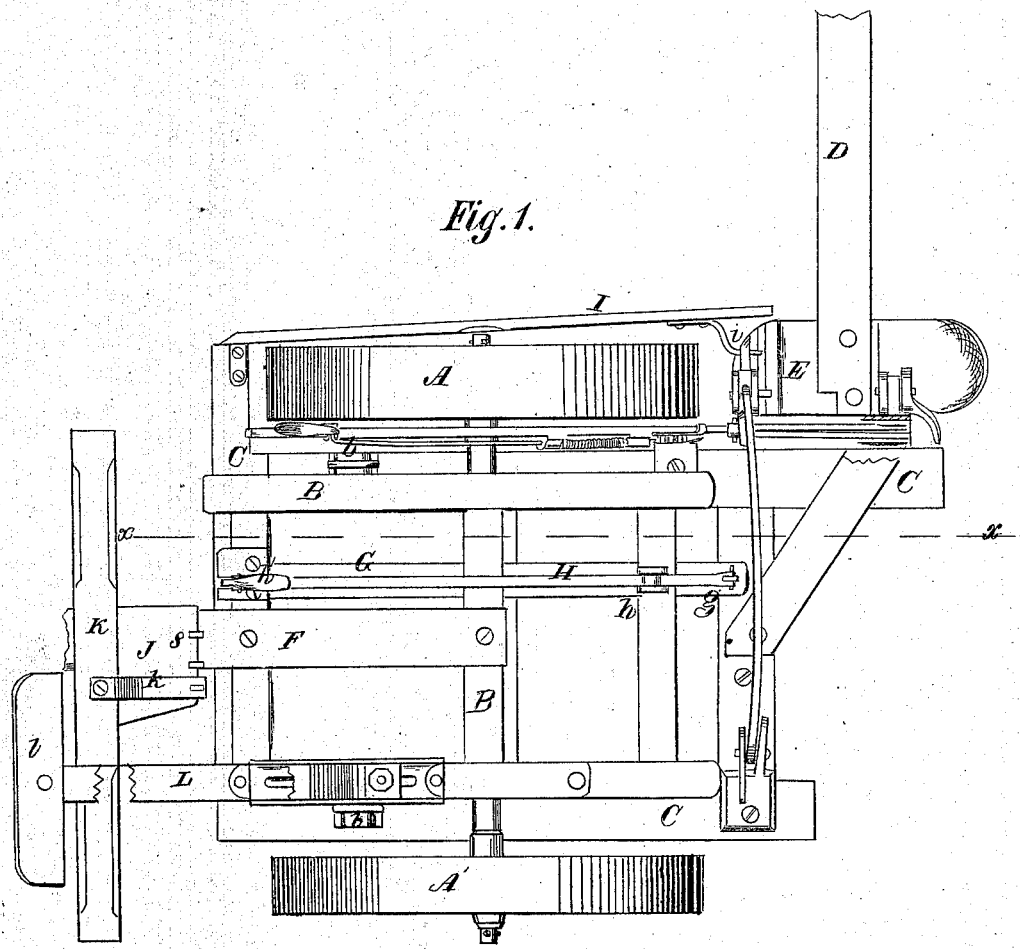

McCormick & Baker.
Mower.
No. 104,618. Patented June 21, 1870.

Witnesses:
Fred Artos
Herm Lauters

Inventor:
L. J. McCormick
Wm. R. Baker
by their Atty
Wm. D. Baldwin

McCormick & Baker,
Mower.
No. 104,618.  Patented June 21, 1870.
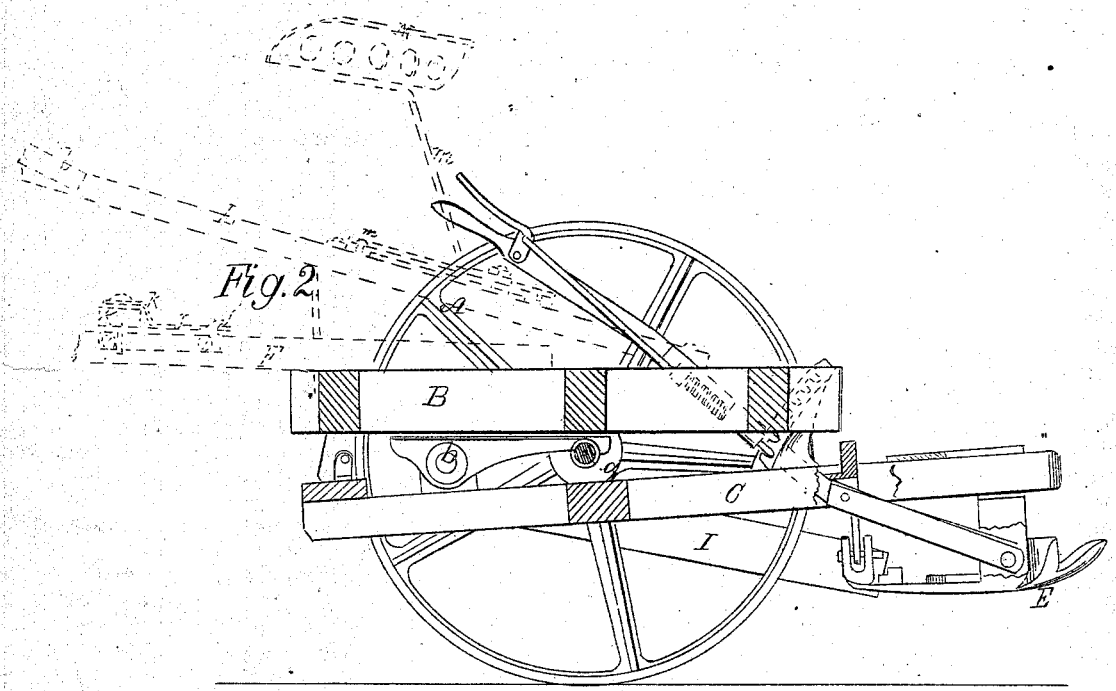
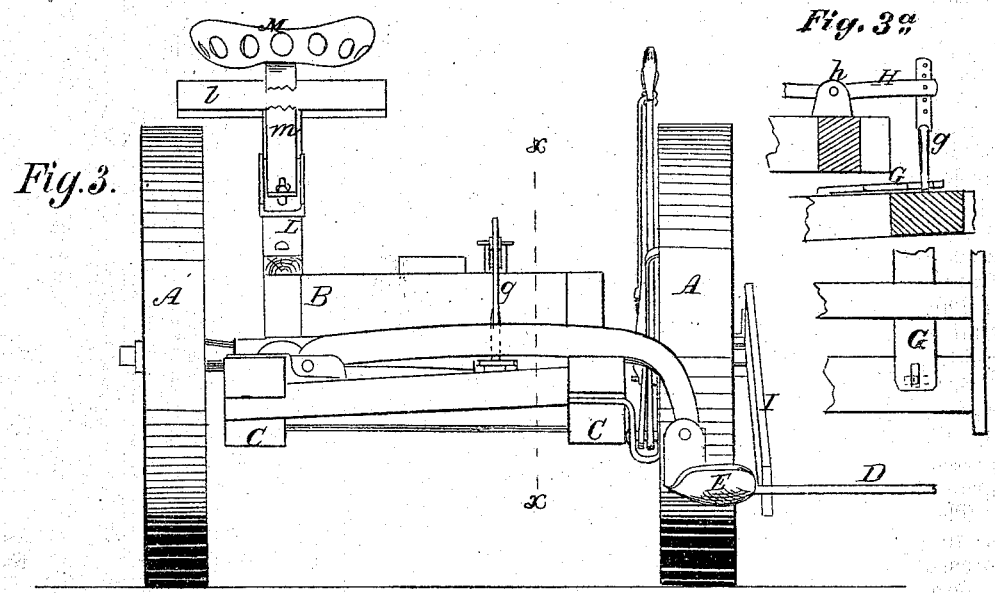
Witnesses:
Fred. Artos
Herm Lauten
Inventor:
D. J. McCormick
Wm. R. Baker
by their Atty
Wm. D. Baldwin

UNITED STATES PATENT OFFICE.

LEANDER J. McCORMICK AND WILLIAM R. BAKER, OF CHICAGO, ILLINOIS, ASSIGNORS TO C. H. McCORMICK & BROTHER, OF SAME PLACE.

IMPROVEMENT IN HARVESTERS.

Specification forming part of Letters Patent No. 104,618, dated June 21, 1870.

*To all whom it may concern:*

Be it known that we, LEANDER J. MCCORMICK and WILLIAM R. BAKER, both of Chicago, in the county of Cook and State of Illinois, have invented certain new and useful Improvements in Harvesters, of which the following is a specification, reference being had to the accompanying drawings, which represent our improvements as applied to the well-known McCormick two-wheeled harvester, and in which—

Figure 1 represents a plan or top view of so much of a harvester embracing our improvements as is necessary to illustrate the subject-matter of the claim; Fig. 2, a vertical section through the machine at the line $x\ x$ of Fig. 1, looking toward the divider; Fig. 3, a view, in elevation, of the same, as seen from behind. Fig. 3$^a$ represents a plan and side elevation of parts of the lever, link, and spring, detached.

In this instance, two wheels, A A', either or both of which may be used to drive the gearing, are shown as mounted on an axle, $a$, upon which the main frame B rests. A supplementary frame, C, is pivoted to the main frame, at $b$, in such manner that it may play freely up and down. The finger-beam D is hinged to this supplementary frame. A tongue, F, projects from the main frame. A plate-spring, G, Fig. 1, is secured, at its front end, to the supplementary frame, and, near its middle, is also secured to the middle cross-beam of this frame.

The machine thus far described is similar to that shown in the patent of McCormick, Erpelding & Baker, No. 89,324, dated April 27, 1869. In that patent the rear end of the spring G was connected with the main frame by a screwed spindle, which regulated the pressure of the cutting apparatus upon the ground, by varying the tension of this spring.

The object of the first part of our invention is to enable the driver, at will, to vary the pressure of the cutting apparatus upon the ground. In order to do this, instead of the screwed spindle connected directly with the main frame, (shown in the patent above mentioned,) we connect the rear end of the spring G by means of a link, $g$, with the rear end of a lever, H, rocking on a fulcrum, $h$, on the main frame. The distance between the lever and spring can be varied by means of a pin passing through the lever and through any one of a series of holes in the link, or by other well-known devices.

The lever H extends forward to the front of the main frame, and has pivoted to its front end a swinging catch-bar, $h'$, which engages with a plate on the front of the main frame, and thus holds the lever in any desired position. This catch-bar can be released at any time by the driver, who, from his seat, acts upon the treadle of the bar with his foot to release the lever; or he can, by bearing on the lever with his foot, lift upon the rear end of the spring, and through it elevate the cutting apparatus.

The link $g$ is made with a long head, which is inserted in a longitudinal slot in the spring, and is then turned one-fourth of a revolution, so as to bring it lengthwise across the slot.

By this mode of construction, the two parts can readily be united or separated, and yet are securely held together, as the pin connecting the link and lever prevents the link from turning. This device is shown at Fig. 3$^a$.

The lever might be curved and attached directly to the spring, if preferred, instead of using a link; but we prefer the link, as it allows more freedom of movement.

The object of the next part of our invention is laterally to adjust the point at which the draft is applied to the tongue without adjusting the tongue itself, as has heretofore usually been done. To do this, we secure upon the tongue a plate, J, having studs $j$ on it. The strap $k$ of the double-tree K, to which the single-trees by which the team draws are attached, hooks over one of these studs, and a pin passing down through the strap and double-tree into one of a series of holes in the plate, holds the parts securely together. The studs being arranged at different distances from the center-line of the tongue $j$, and the pivot of the double-tree being the center of the line of draft, it follows that this line may be thrown to one side or the other of the tongue, as desired, and thus counteract the side draft.

We mount an inclined beam, L, on the outer side timber of the main frame. A foot-board, $l$, is fixed on the front end of this beam, and a longitudinally-slotted plate, *m*, is fastened upon it near its middle.

The seat M for the driver is mounted on a spring-standard, *m'*, which is adjustable backward or forward in the slot of the plate *m*, and is held in any desired position by a set-screw.

The weight of the driver, by this arrangement, is thrown more upon the outer drive-wheel and in front of the axle, thus counterbalancing, to some extent, both the side draft and the weight upon the rear end of the main frame.

We claim as our invention—

1. The combination of the spring, which counterpoises the cutting apparatus, with the lifting-lever, substantially as set forth.

2. The combination of the spring, the lever, and its swinging catch, substantially as set forth.

3. The combination of the tongue-plate, its studs, the strap, and the double-tree, all these parts being constructed to operate as set forth, to adjust the line of draft.

In testimony whereof we have hereunto subscribed our names.

L. J. McCORMICK.
WM. R. BAKER.

Witnesses:
WM. J. HANNA,
W. R. SELLECK.